(12) United States Patent
Goebuchi

(10) Patent No.: US 10,897,314 B2
(45) Date of Patent: Jan. 19, 2021

(54) OPTICAL TRANSCEIVER AND OPTICAL TRANSMISSION/RECEPTION METHOD

(71) Applicant: NEC Corporation, Tokyo (JP)

(72) Inventor: Yuta Goebuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/489,766

(22) PCT Filed: Feb. 28, 2018

(86) PCT No.: PCT/JP2018/007427
§ 371 (c)(1),
(2) Date: Aug. 29, 2019

(87) PCT Pub. No.: WO2018/159657
PCT Pub. Date: Sep. 7, 2018

(65) Prior Publication Data
US 2020/0235819 A1     Jul. 23, 2020

(30) Foreign Application Priority Data

Mar. 3, 2017   (JP) .................................. 2017-040630

(51) Int. Cl.
*H04B 10/61*      (2013.01)
*H04B 10/27*      (2013.01)
*H04B 10/40*      (2013.01)
*H04B 10/54*      (2013.01)

(52) U.S. Cl.
CPC .......... *H04B 10/614* (2013.01); *H04B 10/27* (2013.01); *H04B 10/40* (2013.01); *H04B 10/54* (2013.01); *H04B 10/616* (2013.01)

(58) Field of Classification Search
CPC ...... H04B 10/614; H04B 10/27; H04B 10/40; H04B 10/54; H04B 10/616
See application file for complete search history.

(56) References Cited

U.S. PATENT DOCUMENTS

2010/0209113 A1*   8/2010   Nagaki .................. H04B 10/40
                                                                  398/140
2017/0012708 A1    1/2017   Saathoff et al.

FOREIGN PATENT DOCUMENTS

| JP | 6359125 A | 3/1988 |
|---|---|---|
| JP | 200623245 A | 1/2006 |
| JP | 200749597 A | 2/2007 |
| JP | 2008154170 A | 7/2008 |

(Continued)

OTHER PUBLICATIONS

Bo Zhang et al.,"Practical Limits of Coherent Receivers for Unamplified 100Gb/s Applications", OFC/NFOEC Technical Digest, 2013, IEEE, Mar. 2013, (3 pages total).

(Continued)

*Primary Examiner* — Leslie C Pascal

(57) ABSTRACT

In order to suppress any reduction in the reception performance of an optical transceiver, the optical transceiver includes a light source, an optical splitter that splits the output of the light source into a first split light and a second split light, an optical modulation unit that modulates the first split light, a coherent receiver that causes the inputted received light to interfere with the second split light, and a first control unit that controls the split ratio of the optical splitter on the basis of the reception characteristic of the received light received by the coherent receiver.

16 Claims, 12 Drawing Sheets

(56) References Cited

FOREIGN PATENT DOCUMENTS

| JP | 2013145942 A | 7/2013 |
|---|---|---|
| WO | 2014141685 A1 | 9/2014 |

OTHER PUBLICATIONS

Written Opinion of the International Searching Authority dated May 22, 2018, in International Application No. PCT/JP2018/007427.

International Search Report dated May 22, 2018, in International Application No. PCT/JP2018/007427.

* cited by examiner

OPTICAL TRANSCEIVER AND OPTICAL TRANSMISSION/RECEPTION METHOD

This application is a National Stage Entry of PCT/JP2018/007427 filed on Feb. 28, 2018, which claims priority from Japanese Patent Application 2017-040630 filed on Mar. 3, 2017, the contents of all of which are incorporated herein by reference, in their entirety.

TECHNICAL FIELD

The present invention relates to an optical transceiver and a control method thereof, and particularly relates to an optical transceiver and an optical transmission/reception method in which a transmission function and a reception function of an optical signal share a light source.

BACKGROUND ART

An optical transceiver used in a coherent optical transmission system needs a light source (transmission light source) that generates an optical signal (transmission light) to be transmitted to an optical transmission path, and a light source (local light source) for heterodyne detection of an optical signal (reception light) received from the optical transmission path. Using one light source in common as the transmission light source and the local light source can reduce a size and cost of the optical transceiver. PTLs 1 to 5 disclose a configuration in which one light source is used for transmission and reception.

CITATION LIST

Patent Literature

[PTL 1] Japanese Unexamined Patent Application Publication No. S63-059125
[PTL 2] Japanese Unexamined Patent Application Publication No. 2006-023245
[PTL 3] Japanese Unexamined Patent Application Publication No. 2007-049597
[PTL 4] Japanese Unexamined Patent Application Publication No. 2008-154170
[PTL 5] Japanese Unexamined Patent Application Publication No. 2013-145942

SUMMARY OF INVENTION

Technical Problem

When output of one light source is used for the transmission light source and the local light source, an optical coupler is used for splitting output of the light source. However, when a splitting ratio of the optical coupler is fixed, power of the light source distributed to a transmission function and a reception function is also fixed. For this reason, there is a possibility that power of the local light source does not fall within a range of a value suitable for coherent reception due to necessary power of the transmission light source, individual differences of optical devices used for transmission and reception, and a reception state of reception light. When the value of power of the local light source is not preferable, there is a possibility that reception performance of a receiver declines.

OBJECT OF INVENTION

An object of the present invention is to provide a technique for suppressing a decline in reception performance of an optical transceiver.

Solution to Problem

An optical transceiver of the present invention includes:
a light source;
optical splitting means for splitting output of the light source into first split light and second split light;
optical modulation means for modulating the first split light;
coherent reception means for causing input reception light to interfere with the second split light; and
first control means for controlling a splitting ratio of the optical splitting means, based on a reception characteristic of the reception light received by the coherent reception means.

An optical transmission/reception method of the present inventions includes the procedure of:
splitting output of a light source into first split light and second split light;
modulating the first split light;
causing input reception light to interfere with the second split light; and
controlling a splitting ratio of the first split light and the second split light, based on a reception characteristic of the reception light.

Advantageous Effects of Invention

The present invention is able to suppress a decline in reception performance of an optical transceiver.

EXAMPLE EMBODIMENT

First Example Embodiment

Figure 1:
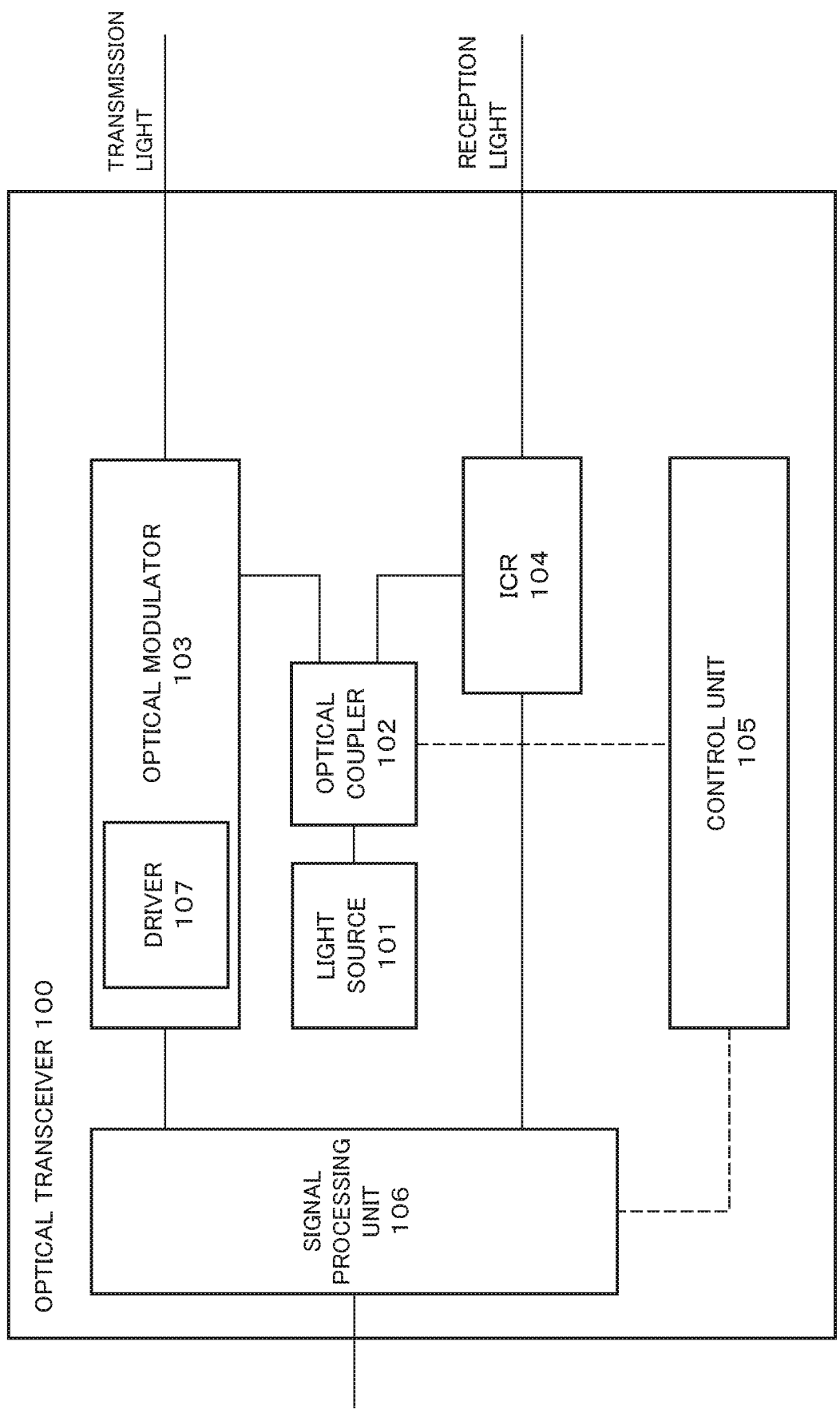
FIG. 1 is a block diagram illustrating a configuration example of an optical transceiver 100 of a first example embodiment.

FIG. 1 is a block diagram illustrating a configuration example of an optical transceiver 100 according to a first example embodiment. The optical transceiver 100 includes a light source 101, an optical coupler 102 serving as optical splitting means, an optical modulator 103 serving as optical modulation means, an ICR 104 serving as coherent reception means, a control unit 105 serving as first control means, a signal processing unit 106 serving as signal processing means, and a driver 107.

The ICR is an abbreviation for an integrated coherent receiver. The ICR 104 coherent-detects reception light and thereby generates an electric signal, and outputs the generated electric signal to the signal processing unit 106.

The light source 101 generates an optical carrier supplied to the optical modulator 103 and the ICR 104. A wavelength-variable laser that generates continuous light can be used as the light source 101. The optical coupler 102 splits output of the light source 101 into two pieces that are a first split light and a second split light, and supplies the first split light and the second split light to the optical modulator 103 and the ICR 104.

A splitting ratio of the optical coupler 102 is variable, and the splitting ratio is controlled by an electric signal output from the control unit 105. For example, the optical coupler 102 is an optical directional coupler constituted by optical waveguides. A configuration of the optical coupler whose splitting ratio is variable is known, and therefore the detailed description is omitted.

One of pieces of output light (the first split light) of the optical coupler 102 is modulated with modulation data. The driver 107 is an electric circuit that generates a drive signal for driving the optical modulator 103. The drive signal is an electric signal used for modulating an optical carrier. The driver 107 converts transmission data output from the signal processing unit 106, into a drive signal having a format and an amplitude suitable for the optical modulator 103.

The ICR 104 performs coherent reception of the reception light by using the other of the pieces of the output light (the second split light) of the optical coupler 102 as a local light in such a way as to interfere with reception light. The control unit 105 controls a splitting ratio of the optical coupler 102, based on a reception characteristic of the reception light in the ICR 104.

The control unit 105 calculates a splitting ratio to be set in the optical coupler 102, and controls the optical coupler 102 in such a way as to produce the calculated splitting ratio. The control unit 105 sets the splitting ratio of the optical coupler 102 in such a way that the ICR 104 can output amplitude necessary for preferable reception.

The signal processing unit 106 generates transmission data to be transmitted by transmission light, outputs the transmission data to the driver 107, and meanwhile, converts a signal coherent-detected by the ICR 104, into a digital signal, and processes the digital signal and thereby generates reception data. The signal processing unit 106 is an electric circuit having a signal processing function, and is constituted by an analog-digital converter and a signal processor, for example. The analog-digital converter converts an analog signal output from the ICR 104 into a digital signal that can be processed by the signal processor. Note that the control unit 105 may be included in the signal processing unit 106.

Figure 2:
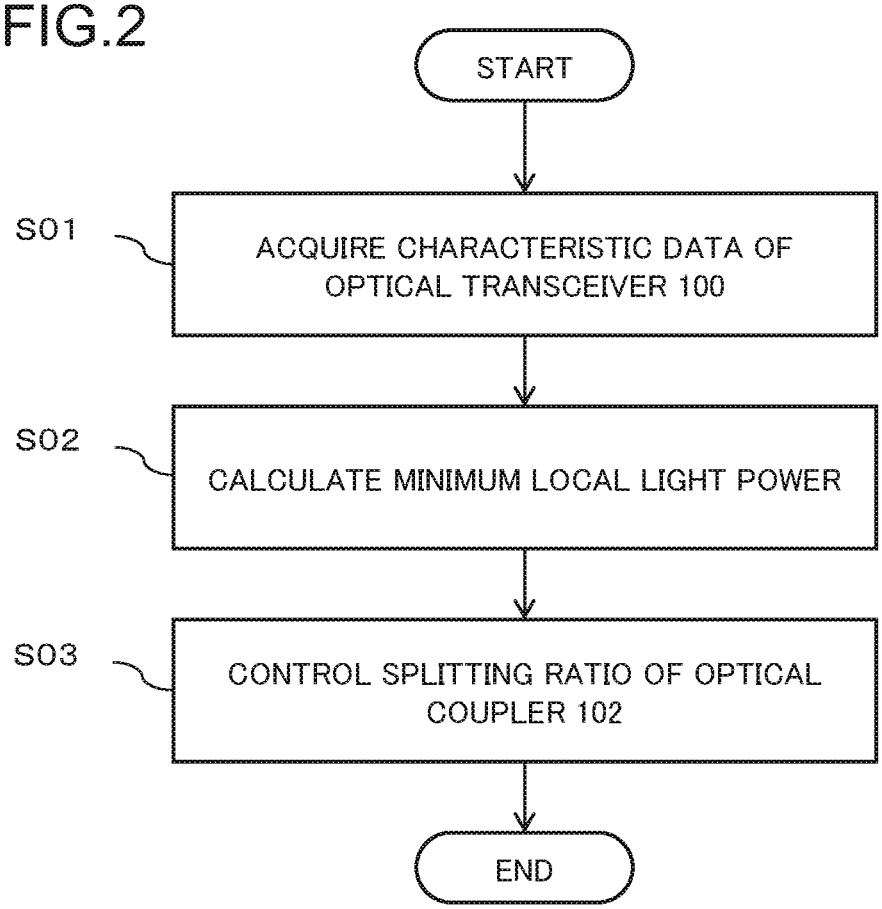
FIG. 2 is a flowchart illustrating an example of a control procedure of a splitting ratio of an optical coupler 102.

FIG. 2 is a flowchart illustrating an example of a control procedure of a splitting ratio of the optical coupler 102, in the control unit 105. The control unit 105 acquires characteristic data of the respective units of the optical transceiver 100. The characteristic data include power of reception light, light reception efficiency (responsivity) of the ICR 104, insertion loss and modulation loss of the optical modulator 103, output power of the light source 101, and prescribed power of transmission light (step S01 in FIG. 2). The characteristic data acquired by the control unit 105 are examples, and are not limited to these. These values of the characteristic data may be acquired from the respective units of the optical transceiver 100 by the control unit 105, or may be written in a storage area (e.g., a non-volatile memory) of the control unit 105 by an operator.

The control unit 105 calculates power of local light (the minimum local light power) necessary for the ICR 104 to operate with a desired characteristic (step S02). The control unit 105 calculates a splitting ratio of the optical coupler 102, based on the calculated minimum local light power, and controls the optical coupler 102 in such a way that a splitting ratio of the optical coupler 102 becomes the calculated value (step S03).

Figure 3:
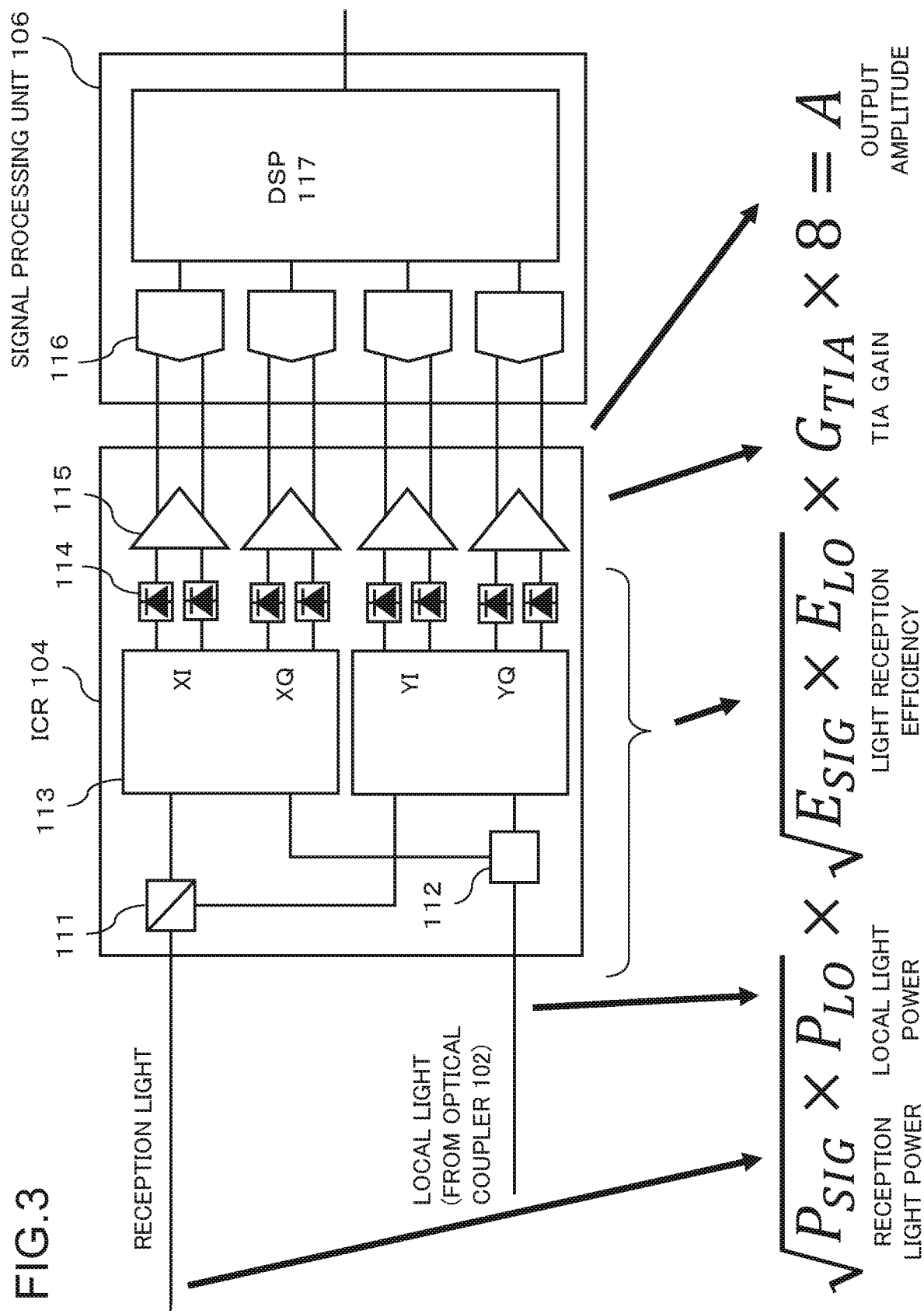
FIG. 3 is a block diagram illustrating a configuration example of an ICR 104 and a signal processing unit 106 included in an optical transceiver 200.

FIG. 3 is a block diagram illustrating a configuration example of the ICR 104 and the signal processing unit 106 included in the optical transceiver 100. The ICR 104 includes a polarization beam splitter (PBS) 111, a beam splitter (BS) 112, two 90-degree hybrid mixers 113, eight photodetectors 114, and four trans-impedance amplifiers (TIAs) 115. The signal processing unit 106 includes four analog-digital converters (ADCs) 116 and a signal processor (digital signal processor (DSP)) 117.

The polarization beam splitter 111 polarization-separates reception light, and inputs the separated light pieces to the 90-degree hybrid mixers 113. The beam splitter 112 splits one of pieces of output light (i.e., a local light) of the optical coupler 102, and inputs the split light pieces to the two 90-degree hybrid mixers 113. The respective 90-degree hybrid mixers 113 cause the reception light of X and Y polarized orthogonally to each other to interfere with the local light, and output the light to the photodetectors 114.

The photodetectors 114 are photodiodes, for example. Four sets each of which includes the two photodetectors 114 output beat signals (XI, XQ, YI, YQ) of inphase (I) components and quadrature (Q) components of the X polarization and the Y polarization in the form of differential signals to the trans-impedance amplifiers 115. Output current of the photodetector 114 is proportional to power of input light to the photodetector 114. The trans-impedance amplifiers 115 convert the four beat signals into voltage signals, and input the voltage signals to the analog-digital converters 116.

The analog-to-digital converters 116 of which number is four convert the signals acquired from the beat signals, into digital signals, and output the digital signals to the signal processor 117. Note that general configurations and operation procedures of the ICR 104 and the signal processing unit 106 are known, and thus, the detailed description is omitted.

The minimum local light power $P_{LO(min)}$ necessary for the ICR 104 at the step S02 in FIG. 2 can be determined as follows.

First, assuming that an output amplitude of the ICR 104 is A (V), A is expressed by the equation (1).

$$A = \sqrt{P_{SIG} \times P_{LO}} \times \sqrt{E_{SIG} \times E_{LO}} \times G_{TIA} \times 8 \qquad (1)$$

Here, $P_{SIG}$ denotes reception light signal power (W) input to the ICR 104, and $P_{LO}$ denotes local light power (W) input to the ICR 104. The symbol $E_{SIG}$ denotes light reception efficiency (responsivity) of a reception light signal in the ICR 104. The symbol $E_{SIG}$ represents conversion efficiency (A/W) of reception light power into output current of a light reception element. The symbol $E_{LO}$ denotes light reception efficiency of local light power. In other words, $E_{LO}$ represents conversion efficiency (A/W) of local light power into output current of the light reception element. Note that in the present example embodiment, it is assumed that conversion efficiency of reception light power into each of the eight photodetectors 114 is $E_{SIG}/8$, and conversion efficiency of local light power into each of the eight photodetectors 114 is $E_{LO}/8$.

The symbol $G_{TIA}$ denotes gain (Ω) of the trans-impedance amplifier 115. Since the trans-impedance amplifier 115 converts current input from the photodetectors 114, into an output voltage, a unit of the gain is represented by V/A (i.e., Ω).

From the equation (1), the minimum value $P_{LO(min)}$ of local light power necessary for preferable reception can be acquired by the equation (2).

$$P_{LO(min)} = (A_{min} \div 8 \div G_{TIA})^2 \div (E_{SIG} \times E_{LO} \times P_{SIG(min)}) \qquad (2)$$

Here, $P_{SIG(min)}$ denotes the minimum value (W) of reception light signal power input to the ICR 104, and $A_{min}$ denotes the minimum input amplitude (V) necessary for the signal processing unit 106. A concrete calculation example is stated below.

Assumption of "$A_{min}$=600 mV$_{ppd}$", "$G_{TIA}$=9000 a", "$E_{SIG}$=$E_{LO}$=0.05 A/W", and "$P_{SIG(min)}$=0.0158 mW (−18 dBm)" leads to "$P_{LO(min)}$=1.76 mW (+2.45 dBm)".

In this case, a splitting ratio of the optical coupler 102 is a ratio at which output power of the light source 101 is distributed to the minimum local light power $P_{LO}$, and thus, the splitting ratio can be acquired as follows. In other words, assuming that a splitting ratio of the optical coupler 102 to the side of the ICR 104 is D (%), and output power of the light source 101 is P (W), a splitting ratio D can be acquired by the equation (3).

$$D = 100 \times \left( \frac{P_{LO(min)}}{P} \right) \qquad (3)$$

In an assumed case of "P=35.5 mW (+15.5 dBm)", substitution of the numerical values stated above for the equation (2) leads to "D=4.96%". This value is a splitting ratio at which the minimum value $P_{LO(min)}$ of local light power necessary for preferable reception is input to the ICR 104. In this case, power of light output from the optical coupler 102 to the optical modulator 103 is "35.5−1.75=33.74 mW (+15.28 dBm)". Then, assuming that insertion loss and modulation loss of the optical modulator 103 is 10 dB and 1.5 dB, respectively, power of an optical signal (transmission light) output from the optical modulator 103 is "15.28−10−1.5=+3.78 (dBm)". Here, excess loss of the optical coupler is ignored.

In the case where a splitting ratio of the optical coupler 102 is fixed, when a splitting ratio is equal to or smaller than 4% for example in the above-described example, power necessary for the local light source used in the ICR 104 cannot be received. Meanwhile, when a splitting ratio is large, there is a possibility that the ICR 104 is supplied with local light of power greatly exceeding power of a range in which the ICR 104 can appropriately operate. However, the optical transceiver 100 according to the present example embodiment adjusts a splitting ratio of the optical coupler 102, based on a reception characteristic of reception light in the ICR 104, and thereby controls power of the local light source. As a result, the optical transceiver 100 according to the first example embodiment can suppress a decline in the reception performance. Further, even when an upper limit exists for local light power at which the ICR 104 can appropriately operate, a splitting ratio at which local light power becomes the upper limit value can be calculated by the similar calculation.

Second Example Embodiment

Figure 4:
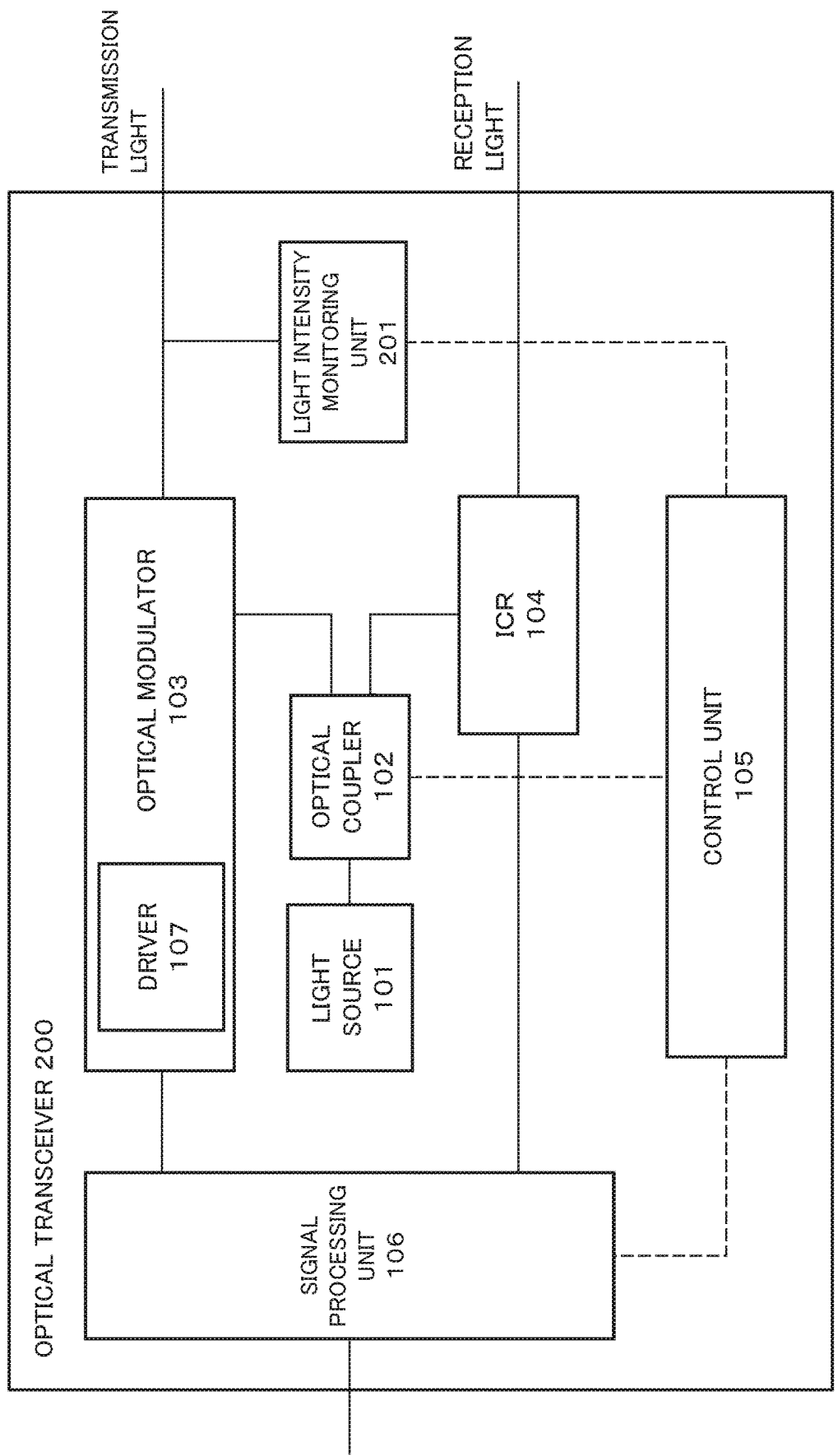
FIG. 4 is a block diagram illustrating a configuration example of the optical transceiver 200 according to a second example embodiment.

FIG. 4 is a block diagram illustrating a configuration example of an optical transceiver 200 according to a second example embodiment. In the following description of the example embodiments and the drawings, the same reference symbols are attached to the already-mentioned elements, and the overlapping description is omitted.

The optical transceiver 200 differs from the optical transceiver 100 according to the first example embodiment in including a light intensity monitoring unit 201 serving as first light intensity monitoring means for monitoring power of transmission light of the optical transceiver 200. Further, the optical transceiver 200 differs from the optical transceiver 100 according to the first example embodiment in that the control unit 105 adjusts a splitting ratio, based on output of the light intensity monitoring unit 201. In the optical transceiver 200, a part of transmission light is split off and input to the light intensity monitoring unit 201. For splitting transmission light, an optical coupler incorporated in the optical modulator 103 may be used. The light intensity monitoring unit 201 outputs, to the control unit 105, an electric signal proportional to an intensity of the input light. Examples usable as the light intensity monitoring unit 201 include a photo diode (PD). In other words, using output of the light intensity monitoring unit 201, the control unit 105 can monitor fluctuation in transmission light power.

Figure 5:
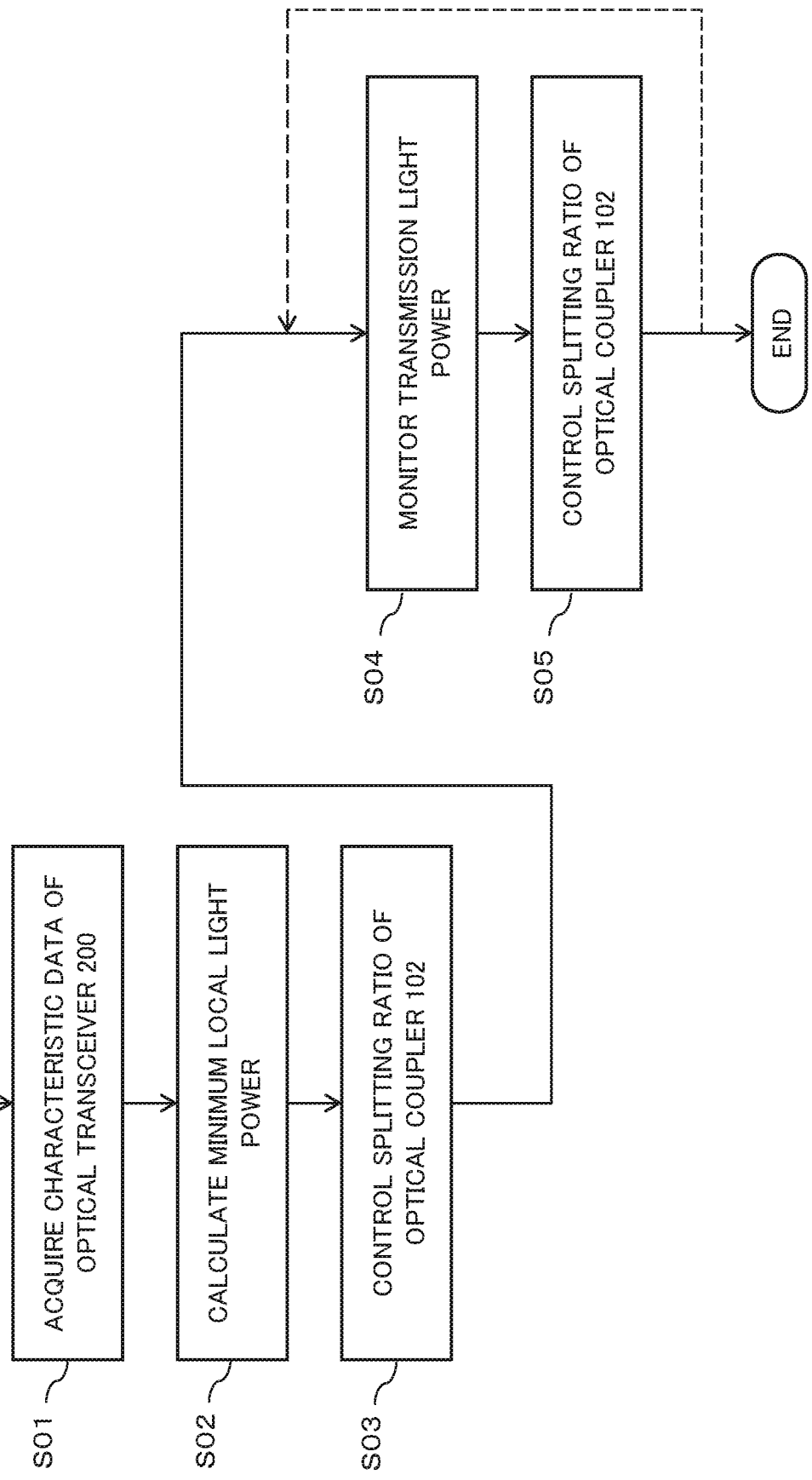
FIG. 5 is a flowchart illustrating an example of a control procedure of the optical transceiver 200.

FIG. 5 is a flowchart illustrating an example of an operation procedure of the control unit 105 in the second example embodiment. In FIG. 5, a procedure (step S04) of monitoring transmission light power and a procedure (step S05) of controlling a splitting ratio of the optical coupler 102 are added as compared with FIG. 2. Further, as illustrated by the broken line in FIG. 5, the procedures of the steps S04 and S05 may be repeated.

The optical transceiver 200 having such a configuration also can suppress a decline in the reception performance by adjusting a splitting ratio of the optical coupler 102 in the procedure similar to that in the first example embodiment. Further, in the optical transceiver 200, when transmission light power fluctuates, the control unit 105 can suppress the fluctuation in the transmission light power by controlling a splitting ratio of the optical coupler 102 in such a way as to compensate the fluctuation amount. Furthermore, the optical transceiver 200 adjusts only a splitting ratio of the optical coupler 102, thus does not need a function of amplifying or attenuating output light power of the light source 101 or transmission light power, and for this reason, can suppress increase in electric power consumption of the optical transceiver 200.

Third Example Embodiment

Figure 6:
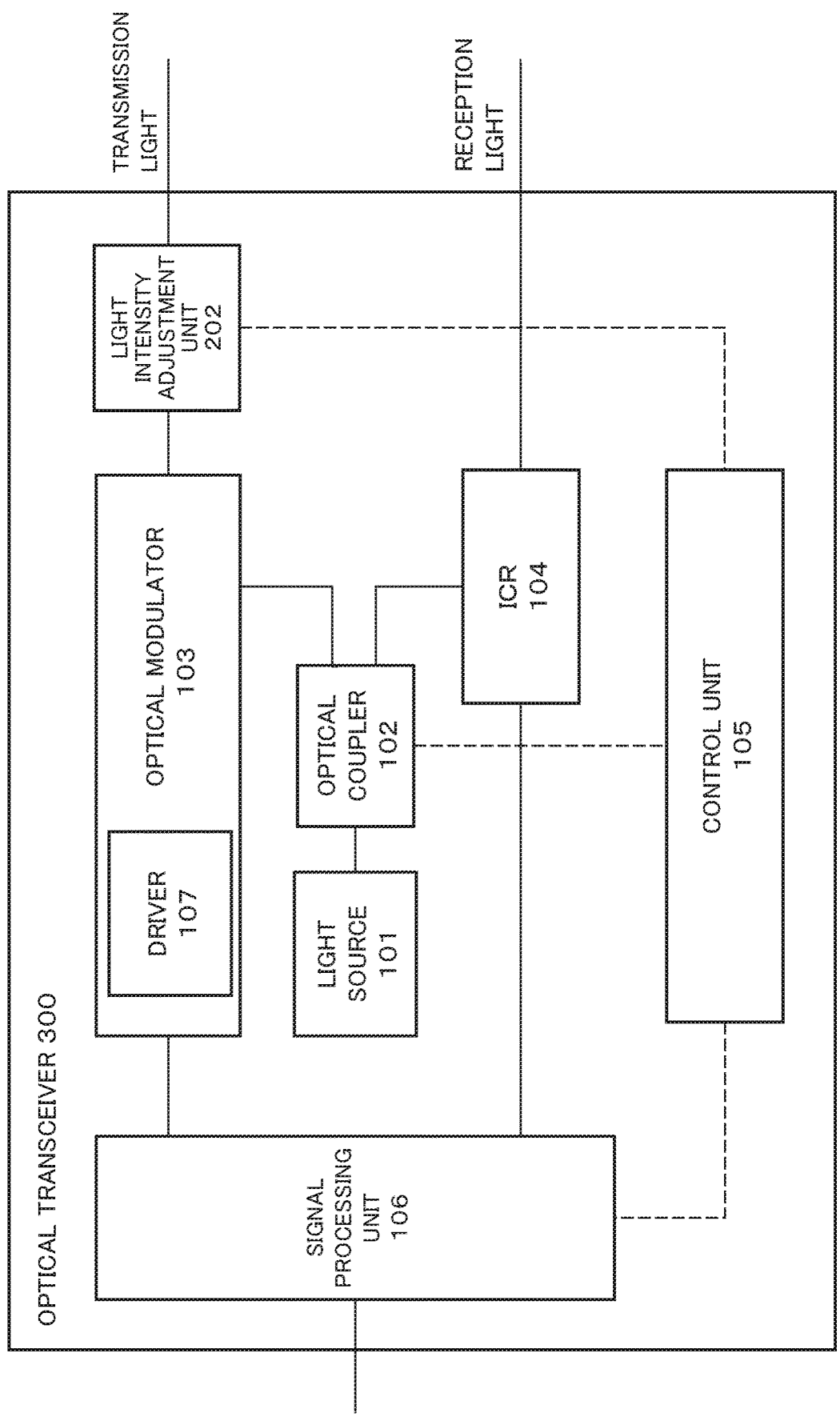
FIG. 6 is a block diagram illustrating a configuration example of an optical transceiver 300 according to a third example embodiment.

FIG. 6 is a block diagram illustrating a configuration example of an optical transceiver 300 according to a third example embodiment. The optical transceiver 300 differs from the optical transceivers 100 and 200 according to the first and second example embodiments in including a light intensity adjustment unit 202 serving as first light intensity adjustment means for adjusting power of output light of the optical modulator 103, and in that the control unit 105 controls the light intensity adjustment unit 202. The light intensity adjustment unit 202 is arranged at an output of the optical modulator 103, and adjusts power of output light, based on an instruction of the control unit 105. An optical amplifier or a variable optical attenuator may be used as the light intensity adjustment unit 202. The optical amplifier amplifies output light power of the optical modulator 103 in accordance with an instruction from the control unit 105. The variable optical attenuator reduces output light power of the optical modulator 103 in accordance with an instruction from the control unit 105.

For example, in the case where a splitting ratio D calculated by the equation (3) is set in the optical coupler 102, when transmission light power of the optical transceiver 300 is smaller than the prescribed value, the transmission light power can be increased by using the optical amplifier as the light intensity adjustment unit 202. In this case, the control unit 105 controls gain of the optical amplifier in such a way as to produce desired output power.

Referring to the numerical value calculated in the first example embodiment, output light power of the optical modulator 103 is +3.78 dBm in the above. Assuming that transmission light power necessary for the optical transceiver 300 is +5 dBm, an amplification factor necessary for the optical amplifier used as the light intensity adjustment unit 202 is 1.22 dB. Accordingly, the control unit 105 controls the optical amplifier in such a way that gain of the optical amplifier becomes 1.22 dB.

In the case where the variable optical attenuator is used as the light intensity adjustment unit 202, when transmission light power of the optical transceiver 300 is larger than the prescribed value, transmission light power can be reduced. In this case, the control unit 105 controls the transmission light power by adjusting an attenuation amount of the variable optical attenuator.

The optical transceiver 300 having such a configuration also can suppress a decline in the reception performance by controlling a splitting ratio of the optical coupler 102 in the procedure similar to that in the first example embodiment. Further, in the optical transceiver 300, when transmission light power fluctuates, the control unit 105 can suppress the fluctuation of the transmission light power by controlling the light intensity adjustment unit 202 in such a way as to compensate the fluctuation amount. Furthermore, in the third example embodiment, the operation of the light intensity adjustment unit 202 does not influence local light power input to the ICR 204, and thus, transmission light power can be controlled over a range wider than that in the optical transceiver 200 of the second example embodiment.

Fourth Example Embodiment

Figure 7:
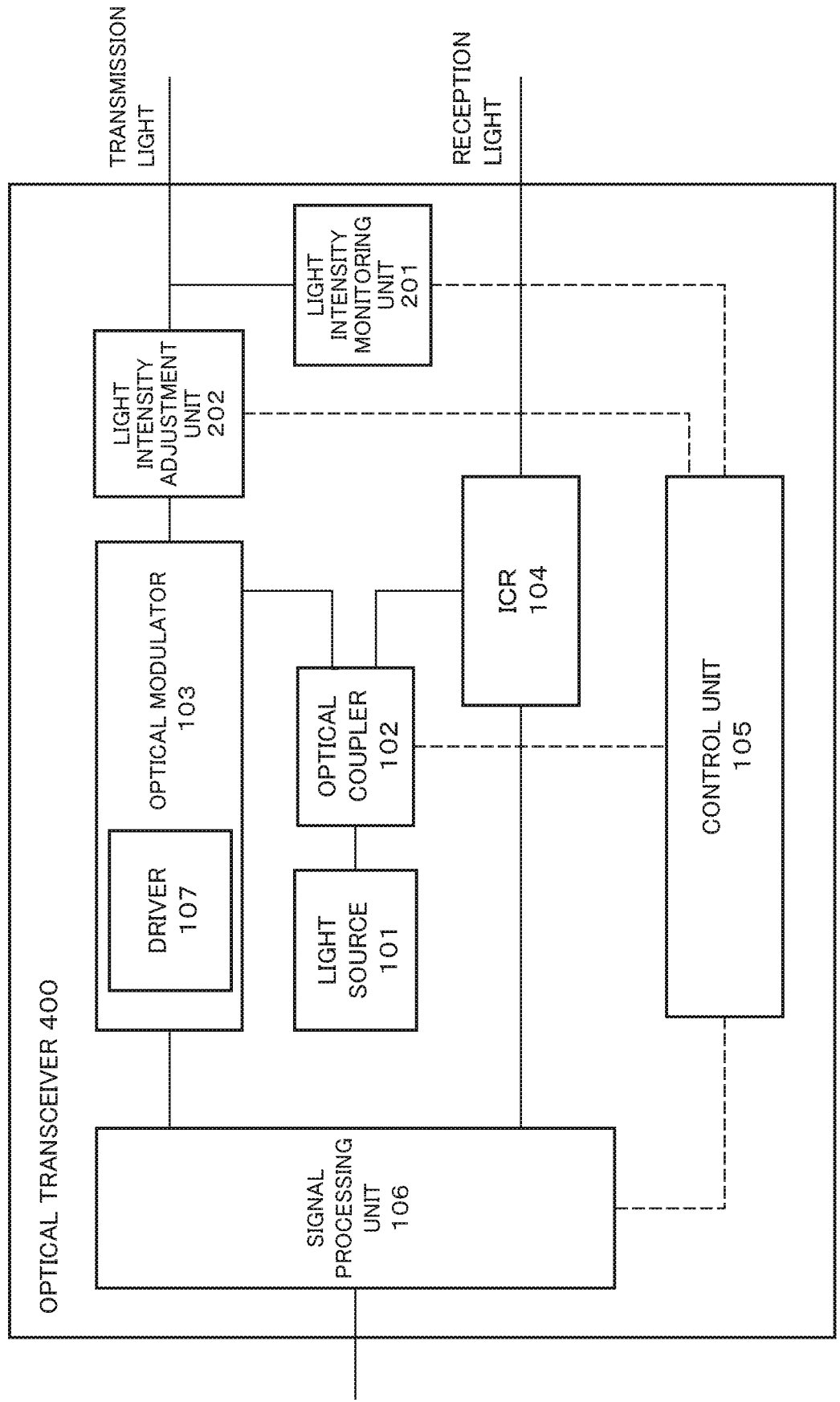
FIG. 7 is a block diagram illustrating a configuration example of an optical transceiver 400 according to a fourth example embodiment.

FIG. 7 is a block diagram illustrating a configuration example of an optical transceiver 400 according to a fourth example embodiment. The optical transceiver 400 differs from the optical transceivers 200 and 300 according to the second and third example embodiments in including both the light intensity monitoring unit 201 described in the second example embodiment and the light intensity adjustment unit 202 described in the third example embodiment.

In the optical transceiver 400, the light intensity monitoring unit 201 outputs, to the control unit 105, an electric signal having an amplitude proportional to output light power (i.e., transmission light power) that has been subjected to the modulation of the light intensity adjustment unit 202. Then, based on the amplitude of the electric signal, the control unit 105 controls the light intensity adjustment unit 202. For example, when an optical amplifier is used as the light intensity adjustment unit 202, transmission light power is kept constant by increasing or decreasing gain of the optical amplifier in such a way that an amplitude of an electric signal output from the light intensity monitoring unit 201 becomes constant.

The optical transceiver 400 according to the fourth example embodiment having such a configuration not only achieves the advantageous effects of the first and third example embodiments, but also achieves an advantageous effect that transmission light power can be more precisely controlled because of controlling transmission light power, based on output of the light intensity monitoring unit 201.

Fifth Example Embodiment

Figure 8:
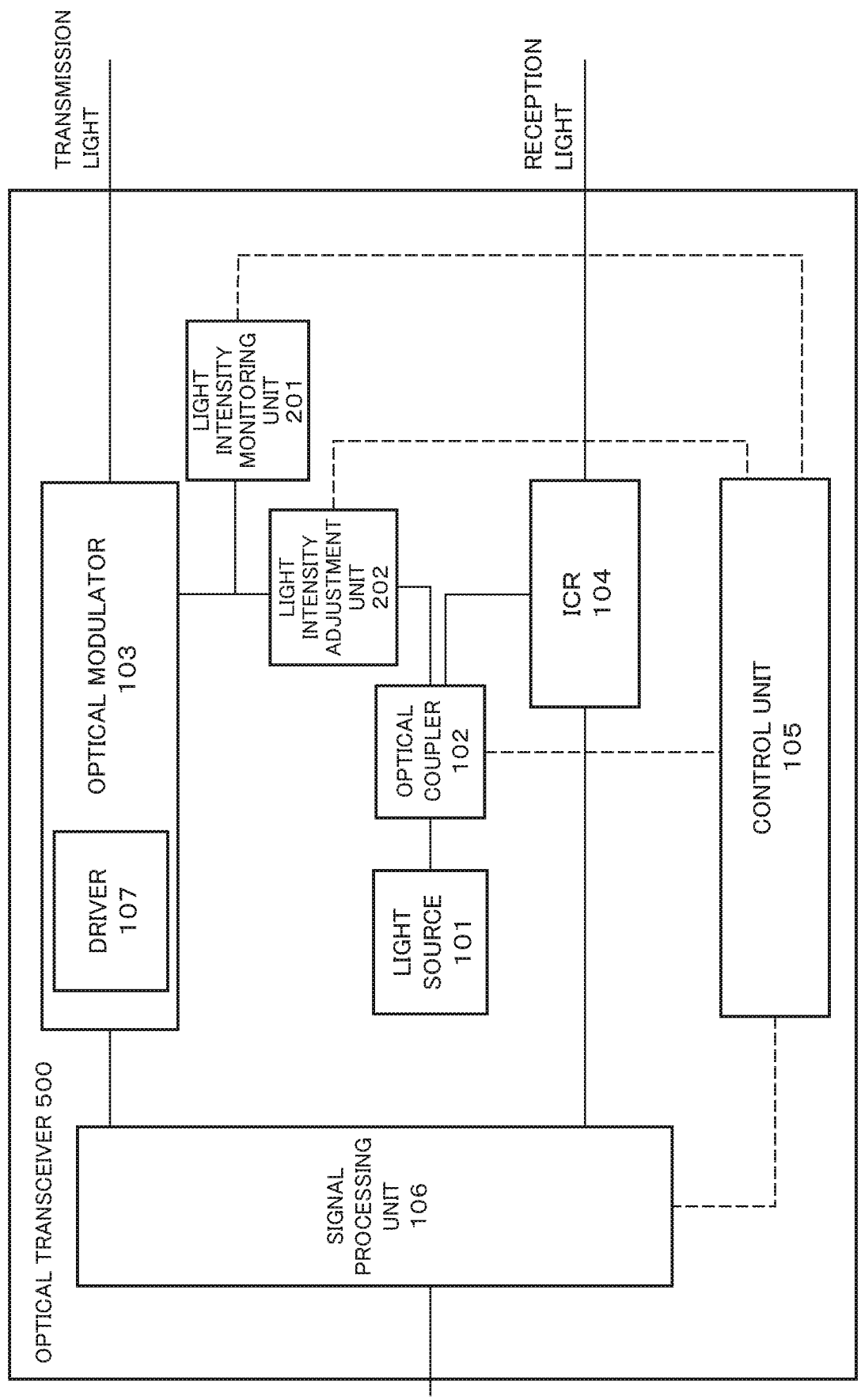
FIG. 8 is a block diagram illustrating a configuration example of an optical transceiver 500 according to a fifth example embodiment.

FIG. 8 is a block diagram illustrating a configuration example of an optical transceiver 500 according to a fifth example embodiment. The optical transceiver 500 differs from the optical transceiver 400 according to the fourth example embodiment in that the light intensity adjustment unit 202 is arranged between the optical coupler 102 and the optical modulator 103, and the light intensity monitoring unit 201 is connected to an output of the light intensity adjustment unit 202. The light intensity adjustment unit 202 serves as first light intensity adjustment means for adjusting power of first split light. The light intensity monitoring unit 201 monitors output power of the light intensity adjustment unit 202. The control unit 105 can increase or decrease transmission light power of the optical transceiver 500 by adjusting the light intensity adjustment unit 202 as in the optical transceiver 400. Further, the control unit 105 can keep transmission light power constant by controlling the light intensity adjustment unit 202, based on an amplitude of an electric signal output from the light intensity monitoring unit 201.

The optical transceiver 500 according to the fifth example embodiment adjusts only input power to the optical modulator 103, and thus achieves an advantageous effect that transmission light power can be controlled over a wider range, as well as the advantageous effect of the optical transceiver 100 according to the first example embodiment.

Sixth Example Embodiment

Figure 9:
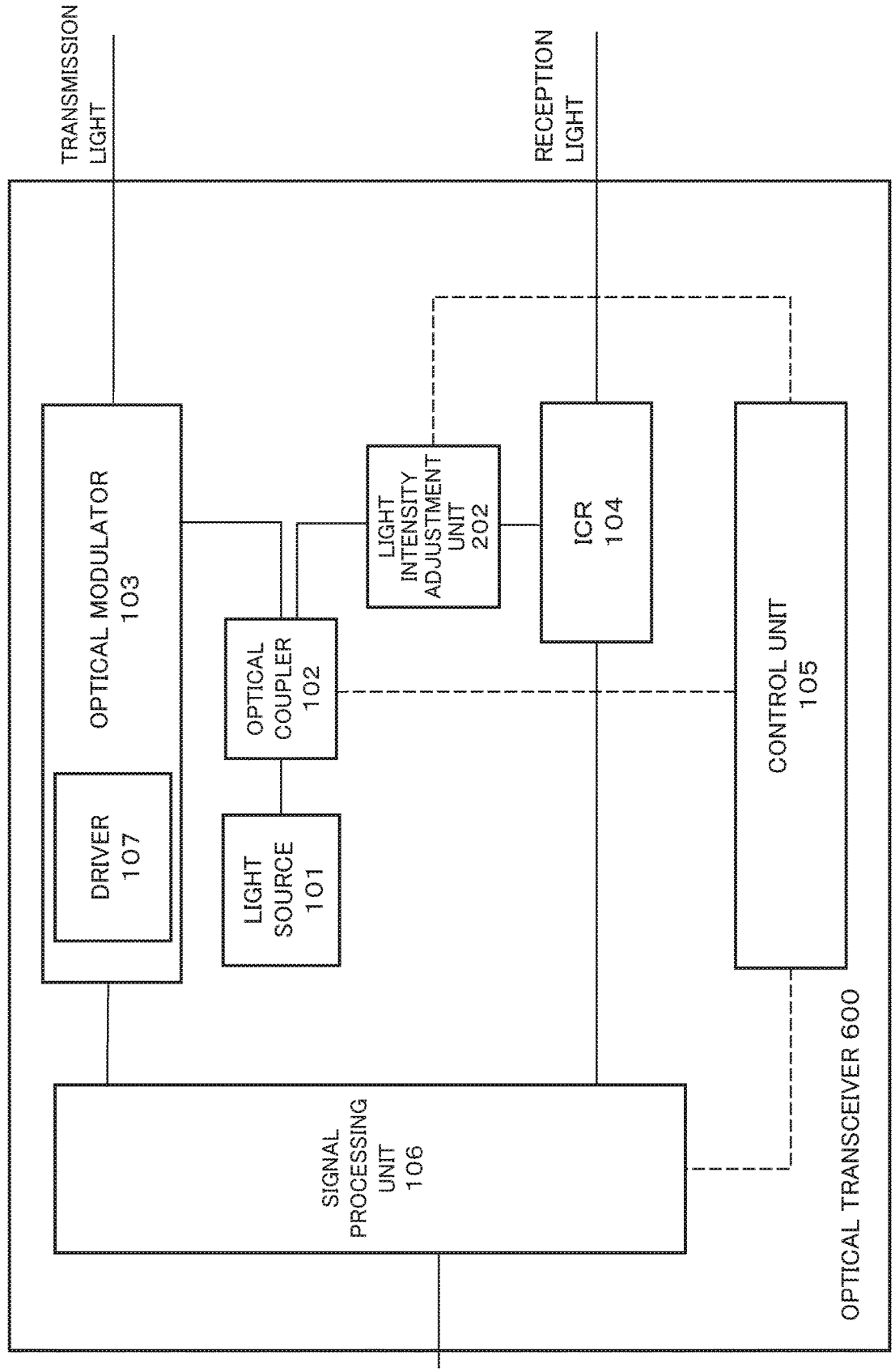
FIG. 9 is a block diagram illustrating a configuration example of an optical transceiver 600 according to a sixth example embodiment.

FIG. 9 is a block diagram illustrating a configuration example of an optical transceiver 600 according to a sixth example embodiment. In the optical transceiver 600, the light intensity adjustment unit 202 serving as second light intensity adjustment means for adjusting power of second split light is arranged between the optical coupler 102 and the ICR 104. The control unit 105 can increase or decrease local light power supplied to the ICR 104 by controlling the light intensity adjustment unit 202, based on output of the signal processing unit 106.

In the optical transceiver 600, the signal processing unit 106 electrically processes output of the ICR 104, and outputs, to the control unit 105, a reception characteristic of reception light coherent-detected by the ICR 104. The control unit 105 controls the light intensity adjustment unit 202, based on the reception characteristic output from the signal processing unit 106. Examples used as the reception characteristic in the present example embodiment may include an error rate of a reception signal in the signal processing unit 106, an amplitude of an electric signal converted from reception light, and an amplification factor of the electric signal. By controlling the light intensity adjustment unit 202, the control unit 105 can increase or decrease local light power input to the ICR 104, in such a way as to reduce an error rate of a reception signal.

The optical transceiver 600 according to the sixth example embodiment not only achieves the advantageous effect of the optical transceiver 100 according to the first example embodiment, but also can achieve optimization of local light power in consideration of fluctuation in a characteristic of the ICR 104 during operation of the optical transceiver.

Seventh Example Embodiment

Figure 10:
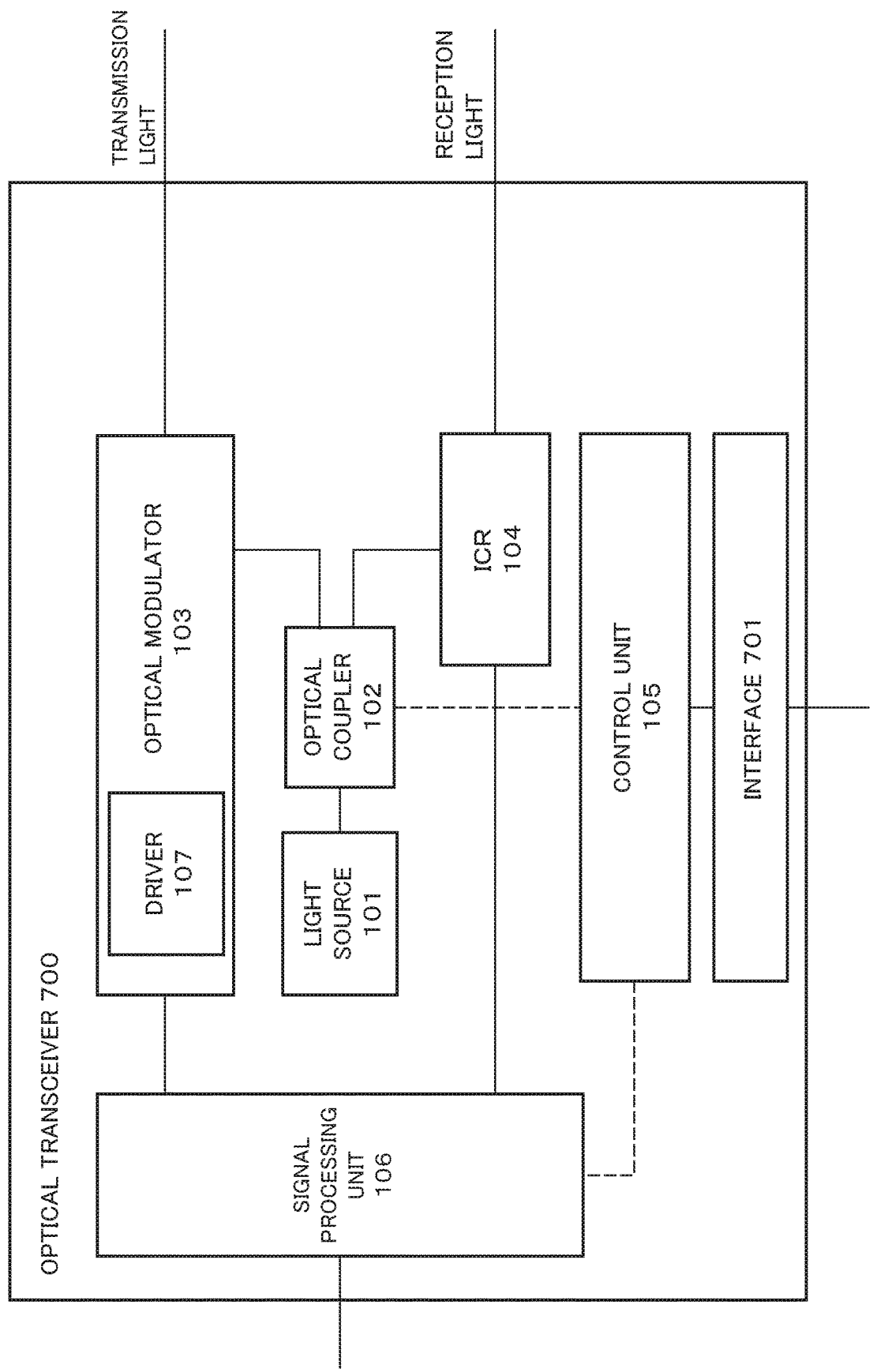
FIG. 10 is a block diagram illustrating a configuration example of an optical transceiver 700 according to a seventh example embodiment.

FIG. 10 is a block diagram illustrating a configuration example of an optical transceiver 700 according to a seventh example embodiment. The optical transceiver 700 differs from the optical transceiver 100 illustrated in FIG. 1 in including an interface 701. The interface 701 receives setting information of the optical transceiver 700 from an outside of the optical transceiver 700, and notifies the control unit 105 of the received setting information. The control unit 105 further uses the setting information at the time of setting a splitting ratio of the optical coupler 102 described in the first example embodiment. An optical transmission device in which the optical transceiver 700 is mounted may notify the interface 701 of the setting information.

When the setting of the optical transceiver 700 is changed, the control unit 105 recalculates a splitting ratio of the optical coupler 102, and based on the recalculation result, sets a splitting ratio again. The setting information of the optical transceiver 700 that becomes a cause of recalculation of a splitting ratio includes a wavelength of transmission light, a wavelength of reception light, a modulation method of transmission light, a modulation method of reception light, power of transmission light, and power of reception light, but is not limited to these. When learning, through notification from the interface 701, that any item of the setting information has changed, the control unit 105 recalculates a splitting ratio of the optical coupler 102, based on the changed setting information, using the equations (2) and (3).

The control unit 105 may include a table in which characteristics of the light source 101, the optical coupler 102, the optical modulator 103, and the ICR 104 are recorded in such a way as to be associated with wavelengths and modulation methods. When the setting information is changed, the control unit 105 reads out, from the table, the characteristic corresponding to the changed setting information, and recalculate a splitting ratio of the optical coupler 102 by substituting a value of the read-out characteristic into the equation (2) and the equation (3).

In the optical transceiver 700 of the seventh example embodiment not only achieves the advantageous effect of the optical transceiver 100 according to the first example embodiment, but also can suppress a decline in the reception performance even when a setting of the optical transceiver 700 is changed during operation of the optical transceiver 700.

In the present example embodiment, the description is made above on the configuration in which the interface 701 is added to the optical transceiver 100 of the first example embodiment. However, any one of the optical transceivers described above in the second to sixth example embodiments achieves the advantageous effect similar to the optical transceiver 700 by being provided with the interface 701.

Eighth Example Embodiment

Figure 11:
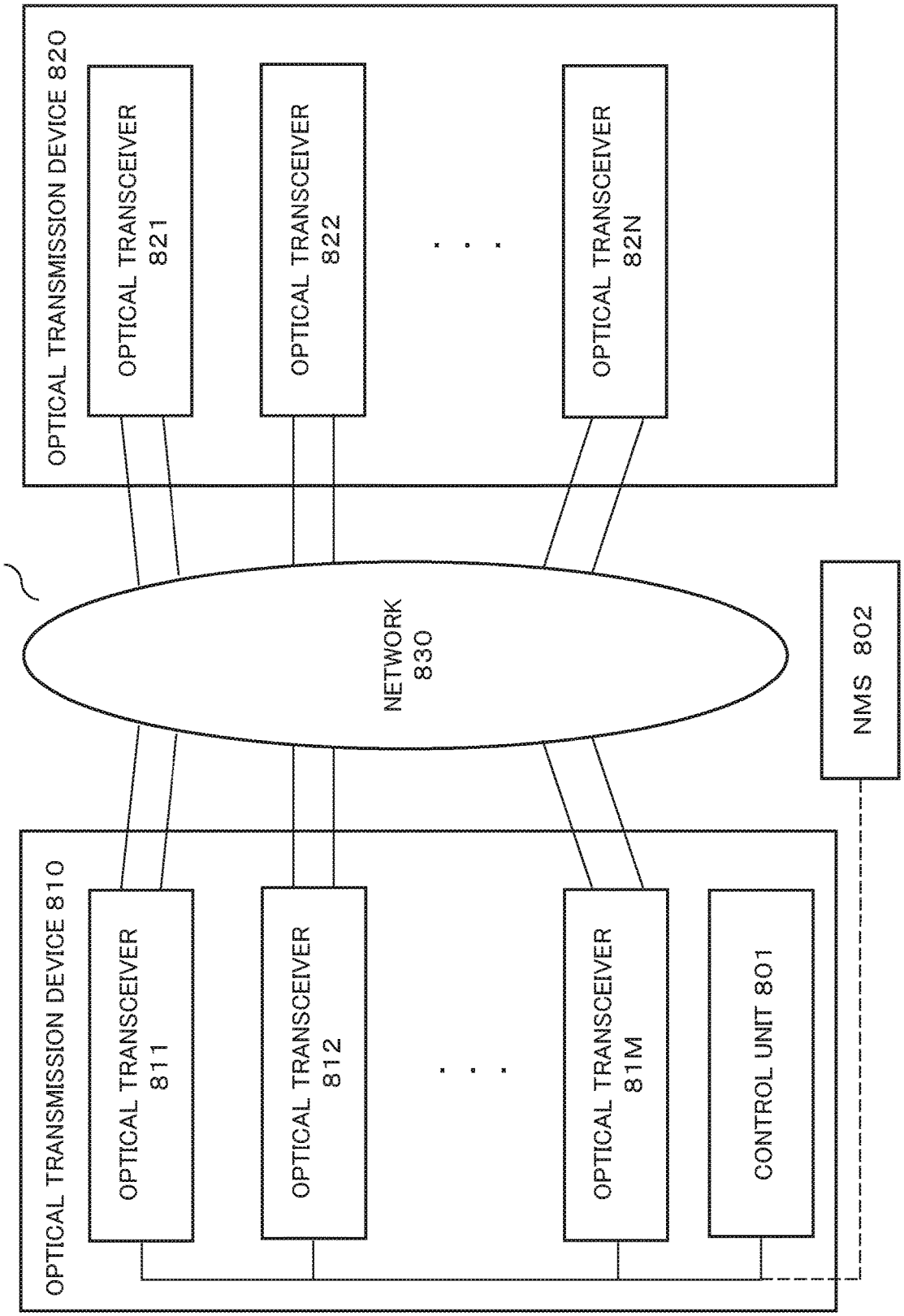
FIG. 11 is a block diagram illustrating a configuration example of an optical transmission system 800 according to an eighth example embodiment.

FIG. 11 is a block diagram illustrating a configuration example of an optical transmission system 800 according to an eighth example embodiment of the present invention. The optical transmission system 800 includes optical transmission devices 810 and 820 connected via a network 830. The optical transmission device 810 includes M optical transceivers 811-81M and a control unit 801, and the optical transmission device 820 includes N optical transceivers 821-82N. The symbols M and N are natural numbers. The control unit 801 serves as second control means for transmitting setting information to the optical transceivers 811 to 81M. The optical transceivers 811 to 81M and the optical transceivers 821 to 82N are each the optical transceiver 700 described in the seventh example embodiment. The optical transceivers 811 to 81M and the optical transceivers 821 to 82N can communicate with each other via the network 830. The control unit 801 transmits, to the optical transceivers 811 to 81M, setting information of the respective optical transceivers.

The optical transmission device 810 having such a configuration can change the setting information of the optical transceivers 811 to 81M, using the control unit 801. Accordingly, the optical transmission system 800 and the optical transmission device 810 according to the eighth example embodiment not only achieve the advantageous effect of the optical transceiver 700 according to the seventh example embodiment, but also can make settings of the optical transceivers 811 to 81M individually or simultaneously during operation of the optical transmission system 800.

Note that although the control unit 801 is provided in the optical transmission device 810 in the present example embodiment, an external network management system (NMS) 802 may have the function of the control unit 801.

Ninth Example Embodiment

Figure 12:
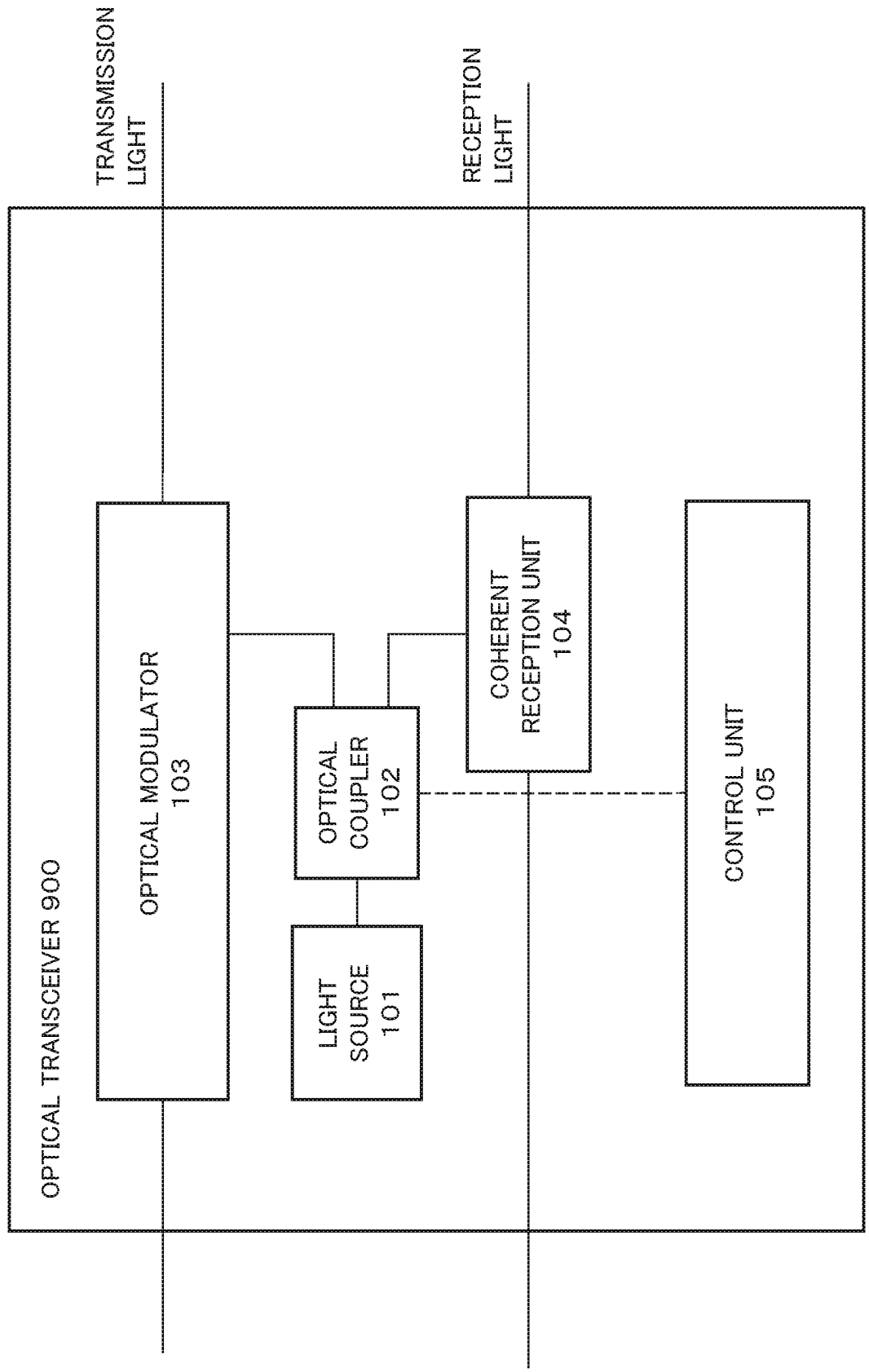
FIG. 12 is a block diagram illustrating a configuration example of an optical transceiver 900 according to a ninth example embodiment.

FIG. 12 is a block diagram illustrating a configuration example of an optical transceiver 900 according to a ninth example embodiment of the present invention. The optical transceiver 100 includes the light source 101, the optical coupler 102, the optical modulator 103, the coherent reception unit 104, and the controller 105.

The optical coupler 102 splits output of the light source 101 into first split light and second split light. The optical modulator 103 modulates the first split light. The ICR 104 causes input reception light to interfere with the second split light. The control unit 105 controls a splitting ratio of the optical coupler 102, based on a reception characteristic of reception light received by the coherent reception unit 104.

Note that the optical coupler can be called an optical splitting unit. The ICR can be called a coherent reception unit.

The optical transceiver 900 having such a configuration can suppress a decline in the reception performance of the optical transceiver 900 by controlling a splitting ratio of the optical coupler 102, based on the reception characteristic.

Modified Examples of Example Embodiments

A description is made on modified examples of the above-described first to ninth example embodiments.

When any one of values of the parameters on the right side of the equation (2) fluctuates, the minimum value $P_{LO(min)}$ of the local light power also fluctuates. In order to keep the ICR 104 operating in a preferable condition, these parameters may be monitored, and when a value of any one of the parameters becomes larger than a predetermined range set for the parameter, a splitting ratio of the optical coupler 102 may be set again. Setting a splitting ratio again can change local light power supplied to the ICR 104, and thereby maintain the favorable operating condition. A splitting ratio may be set again at a predetermined period of time regardless of fluctuation widths of the parameters.

Values representing a reception state may be acquired from monitoring of a value of each parameter on the right side of the equation (2), an output amplitude of the transimpedance amplifier 115, an error rate in the signal processing unit 106, and the like. A threshold value, with respect to fluctuation of a value representing the reception state, for setting a splitting ratio of the optical coupler 102 again can be acquired in advance by a test, and can be stored in the control unit 105. Then, when determining that change of power of the local light source is necessary due to fluctuation in a monitored value, the control unit 105 may change a calculation result of the minimum local light power that has been acquired at the step S02 in FIG. 2, and may set a splitting ratio of the optical coupler 102, based on the changed value.

Note that the example embodiments of the present invention can be described as, but not limited to, the following supplementary notes.

(Supplementary Note 1)
An optical transceiver including:
a light source;
optical splitting means for splitting output of the light source into first split light and second split light;
optical modulation means for modulating the first split light;
coherent reception means for causing input reception light to interfere with the second split light; and
first control means for controlling a splitting ratio of the optical splitting means, based on a reception characteristic of the reception light received by the coherent reception means.

(Supplementary Note 2)
The optical transceiver according to supplementary note 1, further comprising light intensity monitoring means for monitoring power of transmission light of the optical transceiver,
wherein
the first control means adjusts the splitting ratio, based on output of the light intensity monitoring means.

(Supplementary Note 3)
The optical transceiver according to supplementary note 1 or 2, further comprising first light intensity adjustment means for adjusting power of output light of the optical modulation means,
wherein
the first control means controls the first light intensity adjustment means.

(Supplementary Note 4)
The optical transceiver according to supplementary note 1 or 2, further comprising first light intensity adjustment means for adjusting power of the first split light,
wherein
the first control means controls the first light intensity adjustment means.

(Supplementary Note 5)
The optical transceiver according to any one of supplementary notes 1 to 4, further comprising:
second light intensity adjustment means for adjusting power of the second split light; and
signal processing means for electrically processing output of the coherent reception means,
wherein
the first control means controls the second light intensity adjustment means, based on output of the signal processing means.

(Supplementary Note 6)
The optical transceiver according to supplementary note 5, wherein output of the signal processing means represents a reception characteristic of the reception light.

(Supplementary Note 7)
The optical transceiver according to any one of supplementary notes 1 to 6, further comprising an interface that receives setting information of the optical transceiver,
wherein
the first control means controls the splitting ratio, based on the setting information.

(Supplementary Note 8)
An optical transmission device comprising:
an optical transceiver; and
second control means for transmitting setting information to the optical transceiver, wherein
the optical transceiver includes:
a light source;
optical splitting means for splitting output of the light source into first split light and second split light;
optical modulation means for modulating the first split light;
coherent reception means for causing input reception light to interfere with the second split light;
an interface that receives the setting information; and
first control means for controlling a splitting ratio of the optical splitting means, based on the setting information and a reception characteristic of the reception light received by the coherent reception means.

(Supplementary Note 9)
An optical transmission system comprising the optical transmission device according to supplementary note 8 that is connected to another of the optical transmission device via a network.

(Supplementary Note 10)
An optical transmission/reception method comprising:
splitting output of a light source into first split light and second split light;
modulating the first split light;
causing input reception light to interfere with the second split light; and
controlling a splitting ratio of the first split light and the second split light, based on a reception characteristic of the reception light.

(Supplementary Note 11)

The optical transmission/reception method according to supplementary note 10, comprising:

monitoring power of the modulated first split light; and adjusting the splitting ratio, based on the monitored power of the modulated first split light.

(Supplementary Note 12)

The optical transmission/reception method according to supplementary note 10 or 11, comprising controlling power of the modulated first split light, based on the monitored power of the modulated first split light, by using first light intensity adjustment means.

(Supplementary Note 13)

The optical transmission/reception method according to supplementary note 10 or 11, comprising controlling power of the first split light, by using first light intensity adjustment means.

(Supplementary Note 14)

The optical transmission/reception method according to any one of supplementary notes 10 to 13, further comprising:

further providing second light intensity adjustment means for adjusting power of the second split light, and signal processing means for electrically processing a signal generated by the interference; and controlling power of the second split light, based on a signal acquired by electrical processing on a signal generated by the interference.

(Supplementary Note 15)

The optical transmission/reception method according to supplementary note 14, wherein the signal acquired by electrical processing represents a reception characteristic of the reception light.

(Supplementary Note 16)

The optical transmission/reception method according to any one of supplementary notes 10 to 15, further comprising:

further providing an interface that receives setting information; and controlling the splitting ratio, based on the setting information.

Although the present invention is described above with reference to the example embodiments, the present invention is not limited to the above-described example embodiments. Various modifications that can be understood by those skilled in the art can be made on a configuration and details of the present invention within the scope of the present invention.

Further, the configurations described in the respective example embodiments do not necessarily exclude each other.

The action and the advantageous effect of the present invention may be achieved by a combination of all or a part of the above-described example embodiments.

The function and the procedure described above in each of the example embodiments may be implemented by executing a program by a central processing unit (CPU) included in the control unit or the control means. The program is recorded in a non-temporary fixed recording medium. An example used as the recording medium is a semiconductor memory or a fixed magnetic disk device provided in the control unit or the control means, but is not limited to these.

This application is based upon and claims the benefit of priority from Japanese patent application No. 2017-040630, filed on Mar. 3, 2017, the disclosure of which is incorporated herein in its entirety by reference.

REFERENCE SIGNS LIST 100 to 700, 811 to 81M, 821 to 82N, 900 Optical transceiver
101 Light source
102 Optical coupler
103 Optical modulator
104 Coherent reception unit
105, 801 Control unit
106 Signal processing unit
107 Driver
111 Polarization beam splitter
112 Beam splitter
113 90-degree hybrid mixer
114 Photodetector
115 Trans-impedance amplifier
116 Digital converter
117 Signal processor
201 Light intensity monitoring unit
202 Light intensity adjustment unit
802 Network management system
810, 820 Optical transmission device
830 Network

The invention claimed is:

1. An optical transceiver comprising:
a light source;
an optical splitter configured to split output of the light source into first split light and second split light;
an optical modulator configured to modulate the first split light;
a coherent receiver configured to cause input reception light to interfere with the second split light;
a first controller configured to control a splitting ratio of the optical splitter, based on a reception characteristic of the reception light received by the coherent receiver;
a light intensity monitor configured to monitor power of transmission light of the optical transceiver,
wherein
the first controller adjusts the splitting ratio, based on output of the light intensity monitor.

2. The optical transceiver according to claim 1, further comprising a first light intensity adjuster configured to adjust power of the first split light,
wherein
the first controller controls the first light intensity adjuster.

3. The optical transceiver according to claim 1, further comprising a first light intensity adjuster configured to adjust power of output light of the optical modulator,
wherein
the first controller controls the first light intensity adjuster.

4. The optical transceiver according to claim 1, further comprising:
a second light intensity adjuster configured to adjust power of the second split light; and
a signal processor configured to electrically process output of the coherent receiver, wherein
the first controller controls the second light intensity adjuster, based on output of the signal processor.

5. The optical transceiver according to claim 4, wherein output of the signal processor represents a reception characteristic of the reception light.

6. The optical transceiver according to claim 1, further comprising an interface that receives setting information of the optical transceiver,
wherein
the first controller controls the splitting ratio, based on the setting information.

7. An optical transceiver comprising:
a light source;
an optical splitter configured to split output of the light source into first split light and second split light;
an optical modulator configured to modulate the first split light;
a coherent receiver configured to cause input reception light to interfere with the second split light;
a first controller configured to control a splitting ratio of the optical splitter, based on a reception characteristic of the reception light received by the coherent receiver;
a first light intensity adjuster configured to adjust power of the first split light,
wherein
the first controller controls the first light intensity adjuster.

8. The optical transceiver according to claim 7, further comprising:
a second light intensity adjuster configured to adjust power of the second split light; and
a signal processor configured to electrically process output of the coherent receiver, wherein
the first controller controls the second light intensity adjuster, based on output of the signal processor.

9. The optical transceiver according to claim 8, wherein output of the signal processor represents a reception characteristic of the reception light.

10. The optical transceiver according to claim 7, further comprising an interface that receives setting information of the optical transceiver,
wherein
the first controller controls the splitting ratio, based on the setting information.

11. An optical transmission/reception method comprising:
splitting output of a light source into first split light and second split light;
modulating the first split light;
causing input reception light to interfere with the second split light;
controlling a splitting ratio of the first split light and the second split light, based on a reception characteristic of the reception light;
monitoring power of the modulated first split light; and
adjusting the splitting ratio, based on the monitored power of the modulated first split light.

12. The optical transmission/reception method according to claim 11, further comprising
controlling power of the modulated first split light, based on the monitored power of the modulated first split light, by using a first light intensity adjuster.

13. The optical transmission/reception method according to claim 11, further comprising
controlling power of the first split light, by using a first light intensity adjuster.

14. The optical transmission/reception method according to claim 11, further comprising
controlling power of the second split light, based on a signal acquired by electrical processing on a signal generated by the interference.

15. The optical transmission/reception method according to claim 14, wherein
the signal acquired by electrical processing represents a reception characteristic of the reception light.

16. The optical transmission/reception method according to claim 11, further comprising
controlling the splitting ratio, based on the setting information received by an interface.

* * * * *